US008134958B2

(12) United States Patent
Kokku et al.

(10) Patent No.: US 8,134,958 B2
(45) Date of Patent: Mar. 13, 2012

(54) SYNCHRONOUS TWO-PHASE RATE AND POWER CONTROL IN WLANS

(75) Inventors: Ravindranath Kokku, Monmouth Junction, NJ (US); Kishore Ramachandran, Piscataway, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 669 days.

(21) Appl. No.: 12/198,535

(22) Filed: Aug. 26, 2008

(65) Prior Publication Data
US 2009/0092088 A1 Apr. 9, 2009

Related U.S. Application Data

(60) Provisional application No. 60/978,302, filed on Oct. 8, 2007.

(51) Int. Cl.
H04W 4/00 (2009.01)
(52) U.S. Cl. ........ 370/328; 370/329; 370/330; 370/341; 370/503; 455/13.4; 455/502; 455/522
(58) Field of Classification Search .................. 370/328, 370/329, 330, 341, 503; 455/13.4, 127.1, 455/230, 231, 232.1, 502, 522
See application file for complete search history.

(56) References Cited

U.S. PATENT DOCUMENTS

| 7,117,017 | B2 * | 10/2006 | Chen et al. ................. 455/562.1 |
| 7,512,097 | B2 * | 3/2009 | Jelitto et al. ................. 370/329 |
| 2005/0105504 | A1 * | 5/2005 | Sakoda ........................ 370/349 |
| 2006/0046737 | A1 * | 3/2006 | Douglas et al. ............ 455/452.2 |
| 2006/0050661 | A1 * | 3/2006 | Shim et al. ................... 370/318 |
| 2006/0067279 | A1 * | 3/2006 | Kim et al. ..................... 370/335 |
| 2007/0049319 | A1 * | 3/2007 | Hart et al. ..................... 455/522 |
| 2008/0134271 | A1 * | 6/2008 | Qin et al. ....................... 725/118 |

OTHER PUBLICATIONS

Akella, A., et al., "Self-Management in Chaotic Wireless Deployments", Wireless Networks Journal (WINET), In MobiCom, 2005.
Chevillat, P., et al., "Dynamic Data Rate and Transmit Power Adjustment in IEEE 802.11 Wirelss LANs", International Journal of Wireless Information Networks, vol. 12, No. 3, Jul. 2005.
Mhatre, V., et al., "Interference Mitigation Through Power Control in High Density 802.11 WLANs", In Proceedings of IEEE INFOCOM, 2007.
Narayanaswamy, S., et al., "Power Control in Ad-Hoc Networks: Theory, Architecture, Algorithm and Implementation of the COMPOW Protocol", In Proceedings of European Wireless Conference, 2002.

* cited by examiner

Primary Examiner — Christopher Grey
(74) Attorney, Agent, or Firm — Joseph Kolodka

(57) ABSTRACT

A method for operation of a node operating in a wireless network comprising the steps of during an initial phase, setting transmission power and data transmission rate to initial settings and transmitting the initial settings to the wireless network in order to initiate communication with said wireless network during a reference phase once communication with the wireless network is established by the initial phase, transmitting at maximum power while performing a rate adaptation and at least one variable estimation and during an operational phase, transmitting at a power level that is optimal for transmission based on information obtained from the reference phase.

8 Claims, 5 Drawing Sheets

SYNCHRONOUS TWO-PHASE RATE AND POWER CONTROL IN WLANS

This application claims the benefit of U.S. Provisional Application No. 60/978,302 filed Oct. 8, 2007, which is incorporated herein by reference.

BACKGROUND OF THE INVENTION

The present invention relates generally to wireless communication systems and more particularly to synchronous two phase rate and power control in wireless local area networks (WLANs).

Wireless local area networks (WLANs) are becoming prevalent throughout the world. These networks offer users the convenience of being unteathered and free to move about. While initial growth was driven by the laptop community for the home market and home networking, a new market has quickly been emerging. Wireless designers have now incorporated WLAN technology into cell phones, PDA's and other mobile devices. Most of these mobile devices are battery powered, and end users expect at least a few days of continuous use between battery charges. In addition, the WLAN feature, which provides connectivity for the primary applications such as voice, should not significantly reduce the usage time for the primary applications.

One problem associated with a WLAN system is specifically related to mobile users. Mobile users who use dynamic power consumption often experience performance problems. These problems include undesirable data-rate adaptation, receiver-side interference and asymmetric channel access. Network designers are under the impression that dynamic transmit power control is a mismatch for voice over Internet protocol (VoIP) enabled WLANs and as such generally do not use adaptive power control in such systems. Other methods for managing WLANs have focused on either rate or power in isolation. One problem with these methods is that they do not address the problems of receiver-side interference and asymmetric channel access. In view of the foregoing observations, it is both desirable and advantageous to provide an effective method that can significantly reduce the effective power consumption of a WLAN mobile device.

BRIEF SUMMARY OF THE INVENTION

The present invention is directed to an improved method and apparatus for operation of a node operating in a wireless network. The method is made up of a series of steps, called the initial phase, the reference phase and the operational phase. During the initial phase the transmission power and data transmission rate are set to initial settings and these are transmitted to the wireless network in order to initiate communication with the wireless network. During a reference phase, once communication with the wireless network is established by the initial phase, transmitting occurs at maximum power while the node performs a rate adaptation and also performs at least one variable estimation. Lastly, during the operational phase, transmitting occurs at a power level that is optimal for transmission based on information obtained from the reference phase.

The cycle of alternating reference and operational phases is periodically repeated. All nodes in the wireless network are synchronized such that every node executes the reference phase and operational phase at the same time. The initial data rate settings are set to the maximum settings. The initial settings for transmission power and data rate transmission in the operational phase include transmitting multiple probe packets while increasing transmitting power for each successive packet until a probe packet is received by the network. The system reduces both the transmission power and the data transmission rate if the packets were not received by the network after reaching full transmitting power.

DETAILED DESCRIPTION

Embodiments of the present invention relate generally to wireless communication systems, and more particularly, to synchronous two-phase rate and power control (STRAP) in wireless local area networks (WLANs). The invention is particularly advantageous in packet based wireless devices such as those utilizing IEEE 802.11 standards.

Figure 1A:
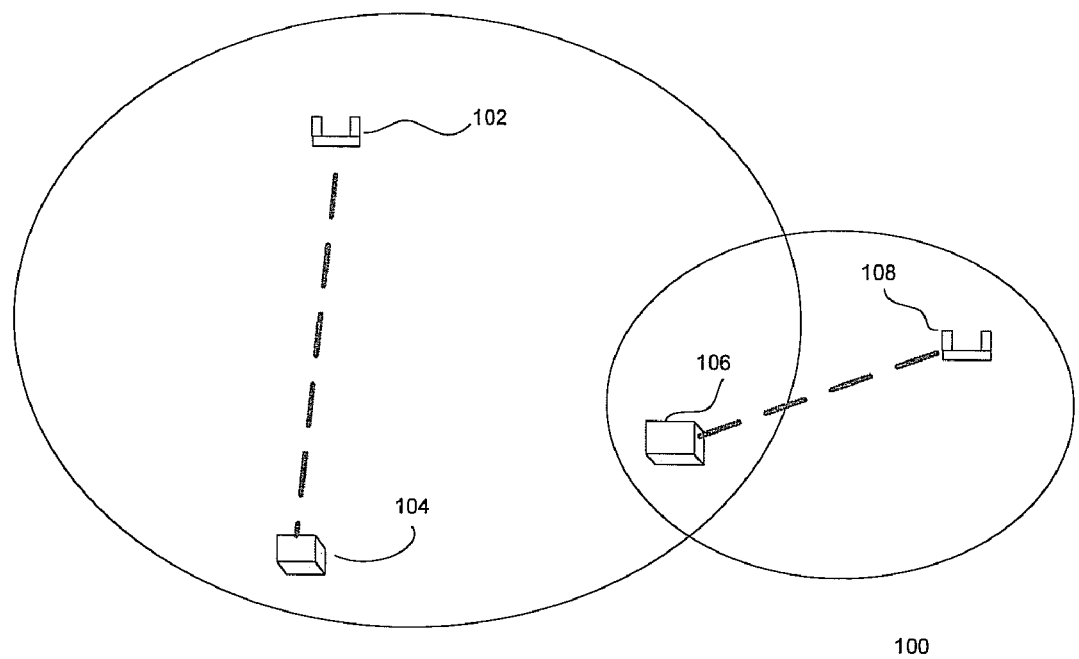
FIG. 1A & FIG. 1B are diagrams illustrating an operating environment for carrying out embodiments of the present invention.
Figure 1B:
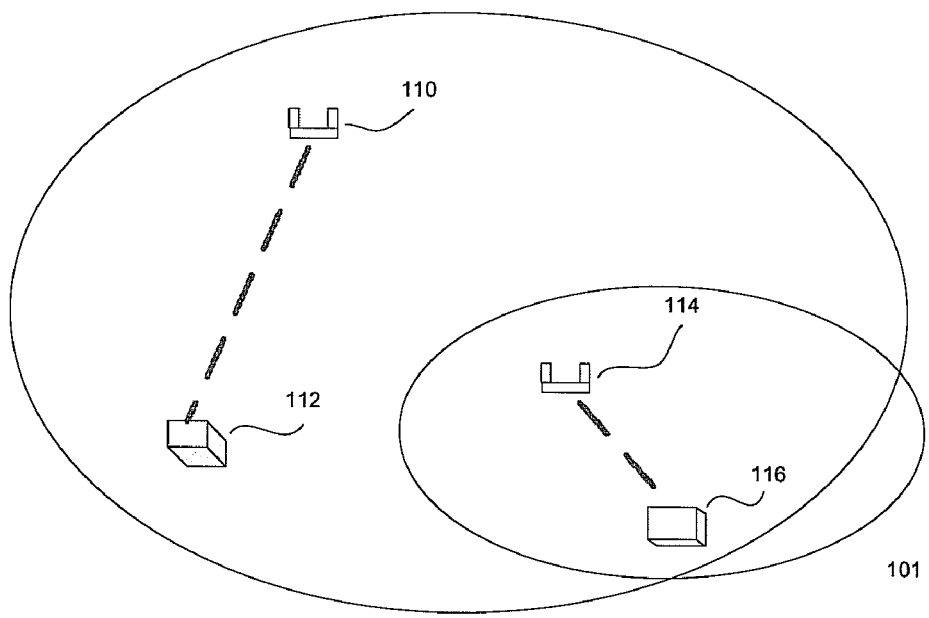

A host of problems pervade WLANs, many of which are introduced by way of power control. FIGS. 1A and 1B illustrate the common problems that occur in the operating environments of WLANs. The operating environment of FIG. 1A is depicted as 100. FIG. 1A illustrates undesirable rate adaptation and receiver side interference. In FIG. 1A, access point 102 is in wireless communication with a node 104 (e.g. a computer). Node 104 is in close proximity to access point 102. Access point 102 detects node 104 and reduces the transmit power level of the node 104 in order to save battery power. The access point 102 reduces the power of the node 104 by sending instructions within the packets. The reduction in power causes a rate control algorithm in the access point 102 to perceive the channel as deteriorating and in turn the access point 102 reduces bit rate in order to enable more robust coding. This reduction of the bit rate adversely affects the network by reducing overall throughput. Receiver side interference is another power control induced problem depicted in FIG. 1A. The problem of receiver side interference occurs because power control does not allow access point 102 and access point 108 to sense each others' transmissions. This in turn causes access point 102 to destroy packets going from access point 108 to computer 106 thus causing interference.

FIG. 1B illustrates the problem of sender side asymmetry. The operating environment of FIG. 1B is depicted as 101. This figure depicts two access points 110 and 114 in communication with two computers 112 and 116 (or other types of nodes) respectively. Access point 114 and computer 116 are operating in the same wireless coverage area as access point 110 and computer 112. Access point 110 and computer 112 have a much broader coverage area than access point 114 and computer 116. Sender side asymmetry is also a problem induced by power control. In this illustration, access point 114 can sense transmissions from access point 110, but access point 110 cannot sense transmissions from access point 114.

Access point 110 never yields the channel to access point 114. This effectively prevents communication between the access point 114 and the computer 116, and leads to the problem of unfair channel access for computers 114 and 116.

Figure 2:
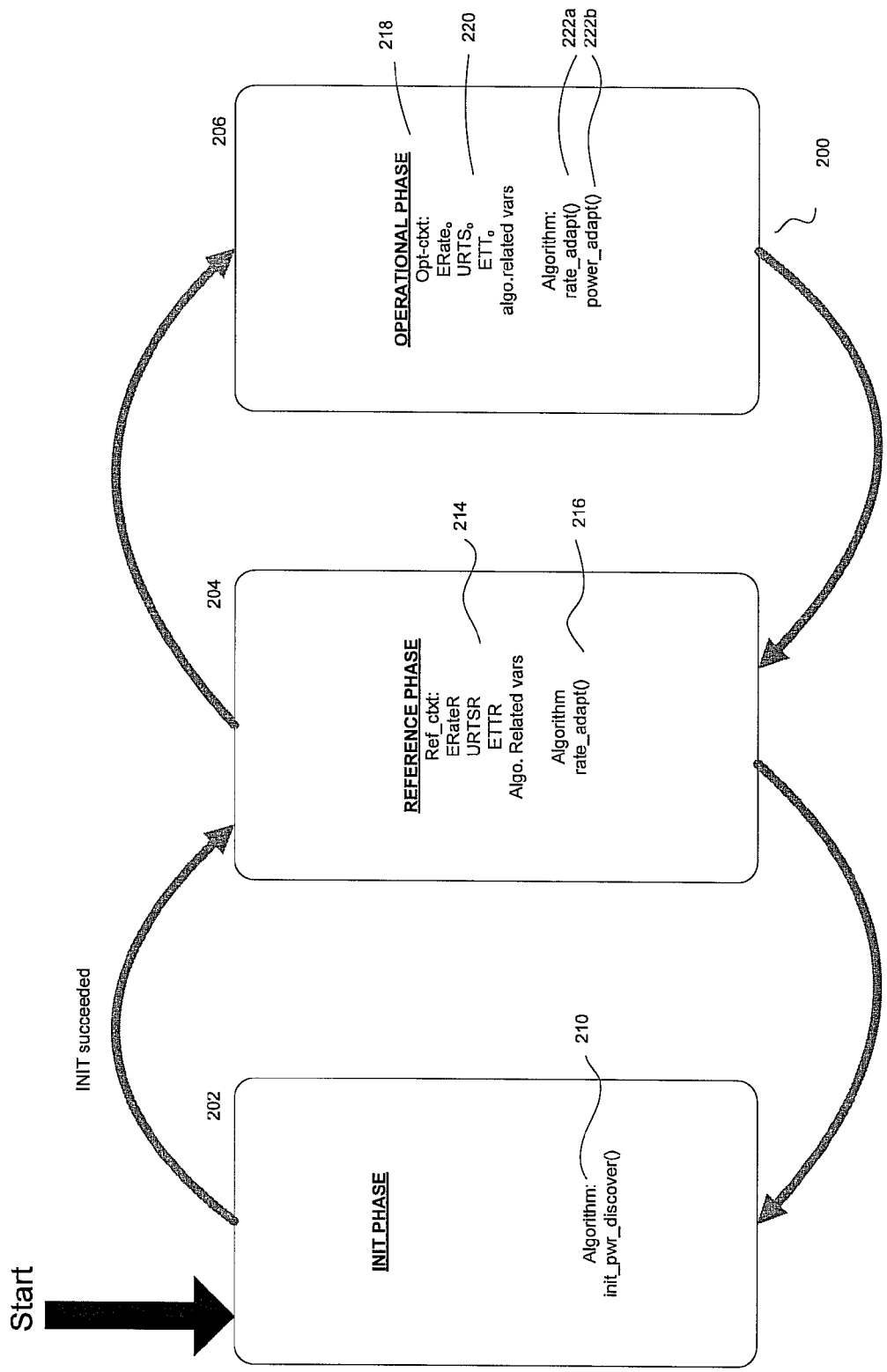
FIG. 2 is a block diagram depicting the elements of and interaction between the three phases of the invention.

Synchronous two phase execution of power and rate control (hereinafter referred to as STRAP) in accordance with the principles of the present invention is illustrated in FIG. 2. Within a wireless local area network all of the networks nodes are first synchronized and then three phases are executed, an initial phase followed by two phases that are in synchronization. The two synchronized phases are the reference phase 204 and operational phase 206. At any instant in time, all of the nodes in the network are in the same phase. A set of rate and power adaptation algorithms control the entire process. The algorithms operate in maintaining two contexts, reference and operational. Each context represents the performance metrics and other quantities needed for executing rate and power adaptation.

FIG. 2 is a block diagram illustrating the three phases of the method: the initial phase 202, the reference phase 204 and the operational phase 206. The initial phase 202 is the first phase and while the initial phase 202 begins the process, the initial phase is not in synchronicity like the reference phase 204 and the operational phase 206.

During the initial phase 202, the sender initializes various quantities (rate and transmit power) for initial operation of the wireless link. Several embodiments of initialization are possible. In one embodiment, the transmission power and data transmission rate are set to an initial setting and the initial settings are transmitted to the wireless network in order to initiate communication with the wireless network. In another embodiment, the sender can start with maximum transmit power and maximum rate in both the reference phase and the operational phase. In another embodiment, the sender in the operational phase starts from the minimum power level and maximum rate, and transmits multiple probe packets by increasing power for each probe packet until a probe packet succeeds in reaching the transmitter. If the sender reaches maximum power and still probe packets do not succeed, the rate is reduced and the sender restarts from the minimum power level. An algorithm 210 controls the initial phase. The algorithm 210 is depicted here as init_pwr-discover( ).

After the success of the initial phase 202, the reference phase 204 begins. This success occurs because the sender determined that the probe packet succeeded on receiving an acknowledgement from the receiver. The reference phase 204 starts at default maximum transmit power and maximum rate after the initiation phase has succeeded. The flowchart in FIG. 3 depicts this as step 304.

Within block 204 of FIG. 2 are a set of metrics 214 and a control algorithm 216, under the heading REFERENCE PHASE. FIG. 3 is a flowchart representing the process of the reference phase. FIG. 4 is a flowchart representing the process of the operational phase. The reference and operational phases are periodically repeated in a cycle where the reference and operations phases are alternating. It may be useful for the reader to refer to more than one of these figures simultaneously while reviewing the specification.

Figure 3:
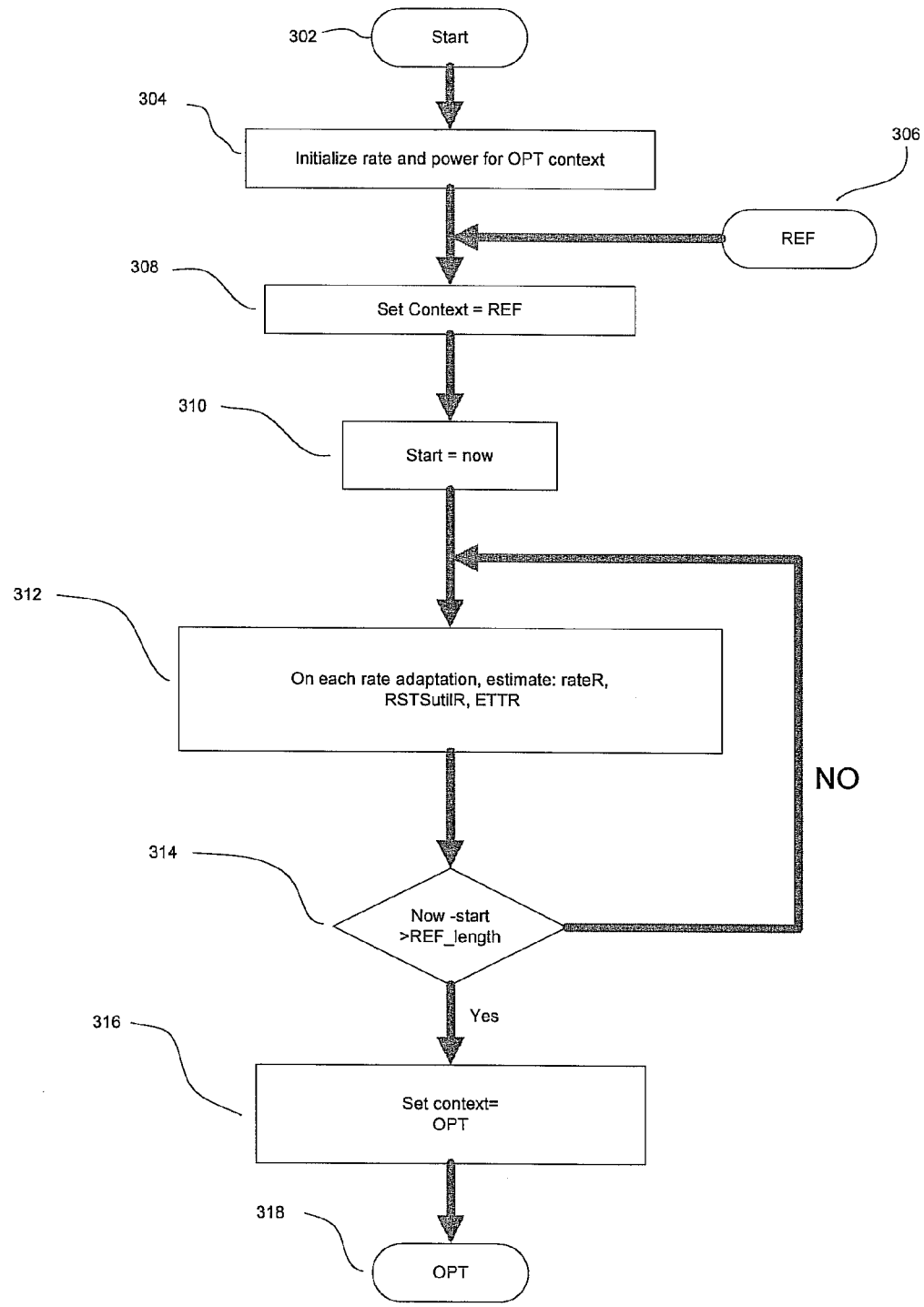
FIG. 3 is a flowchart showing the high-level steps performed by the reference phase of the system in accordance one embodiment of the present invention.
Figure 4:
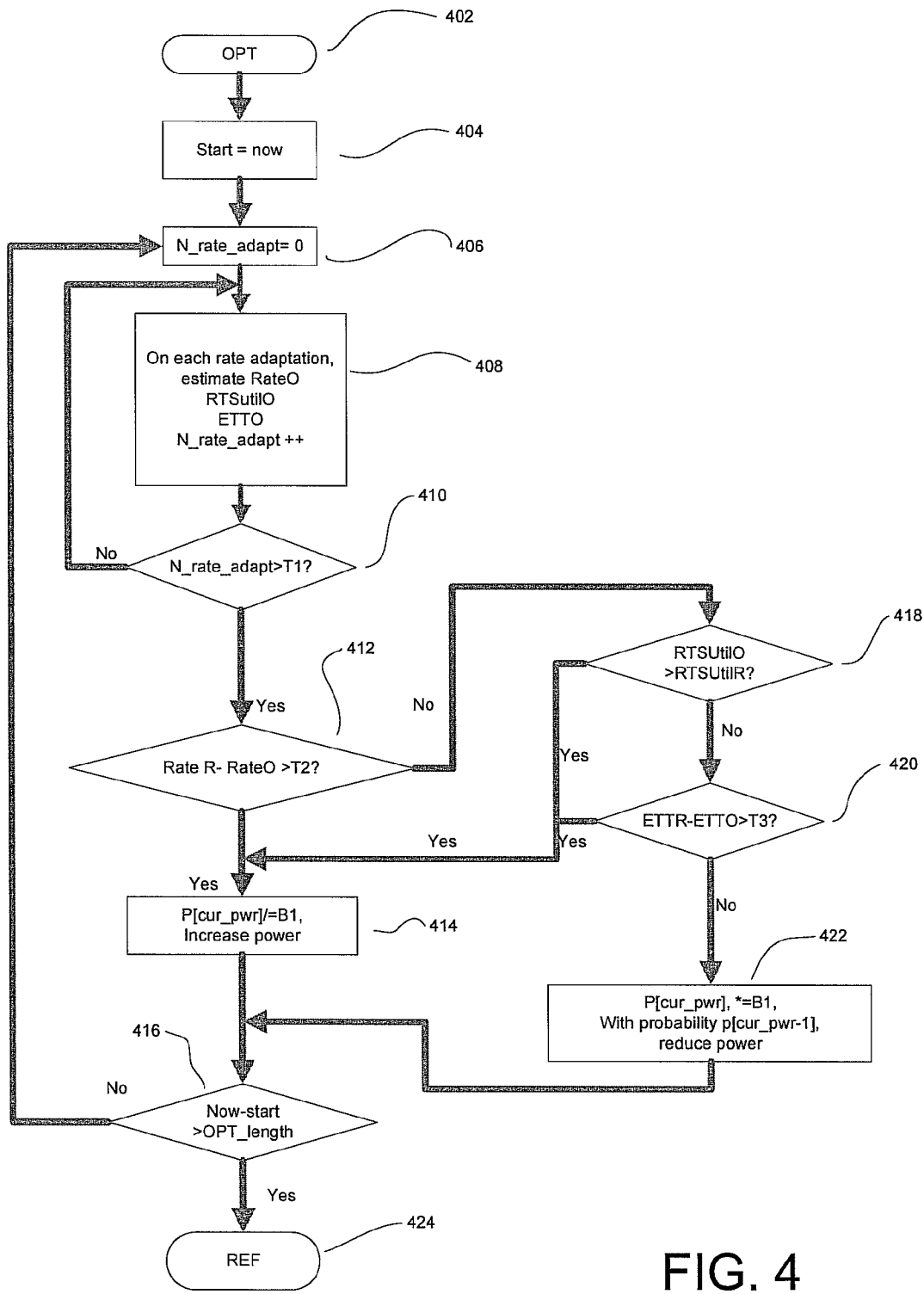
FIG. 4 is a flowchart showing the high-level steps performed by the operational phase of the system in accordance one embodiment of the present invention.

With regard to the steps of the reference phase 204 as shown in FIG. 2, the steps of the method of the reference phase 204 are represented as 300 in FIG. 3. The method of the reference phase begins after the success of the initialization phase 202, shown in FIG. 3 as step 302. After the success of the initialization phase 304, the reference phase, shown as Ref 306, begins and context is set to equal REF instep 308. In step 310 the variable start is set to "Now", which represents the current time during the execution of implementation. Step 312 shows the sender operating at the maximum transmit power level and performing rate adaptation. Here the sender estimates three quantities: RateR, RTSUtilR and ETTR for reference to be used in the operational phase (shown in FIG. 4), RateR represents the best rate achievable at the maximum transmit power. In one embodiment, RateR can be estimated as exponentially weighted moving average (EWMA) of instantaneous rates chosen. For each rate R chosen during rate adaptation, RateR=RateR*(phi1)+R*(1−phi1). The EWMA parameter phi1 is configurable. RTSUtilR represents if a receiver side interference problem exists in the reference phase 204. In one embodiment, RTSUtilR can be estimated by measuring the frame loss rate with and without enabling RTS/CTS (ready to send/clear to send) exchange and setting RTSUtilR to 1 if the loss rate with RTS is lower than without RTS. ETTR represents the expected transmission time of a packet in the air from the sender to the receiver in the reference phase 204. In one embodiment, ETTR can be estimated as the EWMA of individual packet transmission times in the air. The transmission time (TT) for each packet is the time taken by the wireless interface card from the time the packet is received from the higher layer until the last bit of the packet is sent in the air. This is the formula for ETTR: ETTR=ETTR* (phi2)+TT* (1−phi2). The EWMA parameter phi2 is configurable. Step 314 of FIG. 3 shows the decision that is made for the Now-start being greater than the REF_length, if Now-start is greater than REF_length the process moves to step 316. If Now-start is not greater than REF_length then the rate adaptation must be re-estimated and step 312 is performed again until Now-start is greater than Ref_length. In step 316 context is set equal to OPT. This step sets the context equal to that of the operational phase. After Now-start is greater than Ref_length, the process moves onto the OPT phase in step 318.

Referring back to FIG. 2, during the reference phase 204, each access point (AP) performs rate adaptation 216 for each link in the network at the default power, whereas during the operational phase 206, the access point performs both rate 222a and power adaptation 222b. The rate and power adaptation algorithms maintain two contexts, the reference context 214 (shown in the drawings as the ref_ctxt) and the operational context 220 (shown in the drawings as the opt_ctxt), one for each phase in each link. The metrics are chosen to help detect and avoid the problems of undesirable rate adaptation and receiver side interference as well as asymmetric channel access. The performance metrics in the reference context 214 serve as reference values for the operational phase 206. In the operational phase 206 each link is tuned to the lowest power such that each performance metric in the operational context is no worse than the corresponding metric in the reference phase by more than a threshold amount. With these two phases operating in synchronicity, STRAP can successfully detect and avoid the problems introduced by the power control method.

Rate adaptation 216 involves choosing one of several transmission bit rates that differ in coding and modulation supported by 802.11 standards based on the channel conditions; the better the channel condition, the higher the chosen bit rate.

Embodiments of the present invention utilize a rate adaptation algorithm that satisfies three primary requirements; it is agile enough for user mobility in typical WLAN environments, it converges to an appropriate rate for each link rapidly in order to help with power adaptation and finally, it does not drop rate due to receiver side interference, but instead detects the interference and employs the power adaptation algorithm to correct it.

The inventors have invented a unique rate adaptation algorithm. This algorithm is known as robust rate adaptation plus (RRAA+) algorithm. The algorithm is designed to be used specifically with STRAP. The RRAA+ algorithm is based on the robust rate adaptation (RRAA) algorithm but has the unique ability to learn and avoid bad bit rates while providing convergence. In turn, this prevents increased frame loss which leads to reduced overall network throughput.

The robust rate adaptation algorithm (RRAA) uses short term loss estimation of 802.11 frames in a window of tens of frames in order to guide the rate adaptation. The basic RRAA algorithm works with high and low thresholds of loss rate based on a current data rate selected. Further, RRAA uses a mechanism know as "selective request to send" (RTS) and "clear to send" (CTS) for avoiding unnecessary rate adaptation in response to frame collision induced losses. These induced losses are commonly referred to as receiver side interference. The RTS/CTS mechanism is incorporated into the 802.11 protocol and was originally designed to reduce frame collisions introduced by the hidden terminal problem. RRAA works as follows: in order to detect frame loss the RRAA algorithm enables RTS/CTS on a selective number of frames. Next, if RTS/CTS succeeds in reducing the frame loss, the RTS/CTS mechanism is increasingly enabled on a greater number of frames. If however, RTS/CTS fails to reduce frame loss, then RRAA determines that losses are due to channel conditions and not caused by receiver side interference. The algorithm then reduces the rate RTS/CTS is used per frame.

Basing rate adaptation on loss estimation for a group of packets helps the transmitter to not react adversely because of one or perhaps a few packet losses. Packet losses such as this are common occurrences associated with mobility and power control. While RRAA offers some utility it does have some drawbacks, one drawback is that it does not converge to a particular rate if the current rate is higher than appropriate. For example, if a 54 Mbps rate causes frame loss higher than that of the high threshold, and a rate of 48 mbps causes frame loss lower than that of the low threshold, RRAA keeps flipping between 54 and 48 Mbps. Ideally the algorithm should converge to 48 Mbps.

The modified RRAA algorithm, RRAA+ offers the unique feature of convergence. This feature causes the system to converge to an optimal bit rate. RRAA+ maintains for each bit rate, the probability that the transmitter transitions to this bit rate from a lower bit rate. Every time (in an interval of time or packets) the loss at a bit rate exceeds the high threshold, the probability of returning to this bit rate is reduced by a factor A1 before transitioning to the next lower rate. In each interval, if the bit rate causes the packet loss to be below the low threshold, the probability of this bit rate is increased by a factor A2. The multiplicative increase multiplicative decrease (MIMD) parameters A1 and A2 are used in order to keep the algorithm stable. The values of A1 and A2 are configurable; however, we observed in typical WLAN settings that A1=2 and A2=1.0905 are appropriate. Another unique feature of RRAA+ is an adaptive request to send (RTS) mechanism. In order to prevent receiver side interference the RTS is estimated. The adaptive RTS mechanism detects any packet losses that are happening due to collisions as opposed to degraded channel conditions.

Referring to FIG. 4, the flowchart representing the operational phase 206 is shown. The steps of the operation phase begin at step 402. During the second step 404, START is set to NOW, where NOW represents the current time during execution of the implementation. The third step 406, N_rate_adapt=0 initializes to zero.

During the operational phase, the sender operates at a transmit power level that is optimal for the successful transmission of the packet. Step 408 shows the performance of rate adaptation and estimation of quantities RateO, RTSUtilO, ETTO and N_rate_adapt, which represents the rate adaptation. These estimations are similar to that of RateR, RTSUtilR and ETTR as previously described in the reference phase flowchart of FIG. 3. N_rate_adapt counts the number of rate adaptations done. After step 408, in step 410, it is determined whether N_rate_adapt is greater than T1. T1 represents a threshold that is sufficient to get a reliable estimate of rate; in one implementation, we chose T1 to be 2. If N_rate_adapt is greater than T1 the process proceeds to step 412. If N_rate_adapt is not greater than T1 step 408 is performed again. Steps 408 and 410 will be repeated until N_rate_adapt is greater than T1. In step 412, it is determined whether RateR-RateO is greater than T2. T2 is a threshold placed on the reduction of rate tolerable due to power control. In one implementation, we choose T2 to be 3 Mbps for bitrates above 36 Mbps and below 24 Mbps, and 6 Mbps for other bitrates between 24 Mbps and 36 Mbps. These values were chosen due to the non-uniformity in bit rate granularity in 802.11. If RateR−RateO is greater than T2 than control is passed to step 414. If the Rate R-Rate 0 is not greater than T2, control moves to step 418. In step 418 it is determined whether RTSUtil0 is greater than RTSUtilR, if it is, control is passed to step 414. If however RTSUtil0 is not greater than RTSUtilR than control is passed to step 420. In step 420 it is determined whether ETTR-ETT0 is greater than T3. If yes, then control is passed over to step 414. If no, then control is passed to step 422. In step 414 power is increased based on a table of probabilities with one entry for each transmit power value, this is represented as P[cur_pwr]/=B1. Conversely, in step 422 power is reduced based on the table and formula P[cur_pwr]*=B1 with a probability of p[cur_pwr−1]. In step 416 it is determined whether Now-start is greater than Opt_length. If yes, then control is passed back to the reference phase 424. If no, then control is transferred back to step 406 and the entire process is repeated until Now-start is greater than the OPT_length in step 416.

Referring again to FIG. 2, another aspect of embodiments of the present invention is power control. Power control is performed using a power adaptation algorithm 222b. Power adaptation is used to tune each access point (AP) client link in a WLAN to the lowest appropriate transmit power value such that the performance metrics in the operational phase 206 are no worse than the corresponding metric in the reference phase 204. Similar to RRAA+, the power control algorithm 222b determines the optimal power level by maintaining the probability with which it should transition to a particular level.

In practice embodiments of the present invention detect and prevent undesirable rate adaptation, receiver side interference and asymmetric channel access for each link. The reference context 214 and the operational context 220 maintain an exponential weighted moving average (EWMA) of the bit rate chosen by the rate control algorithm 216 and 222b in response to the measured packet loss. This occurs for each new bit rate chosen. If the EWMA rate in the operational phase 206 is lower than that in the reference phase 204 by a threshold amount, a transmit power increase is triggered. In one embodiment, an example of the EWMA parameter is 0.8 and the increment of change in transmit power is 3 dB.

In order to prevent asymmetric channel access that is introduced by power control, the synchronized method 200 first detects the asymmetric channel access by measuring the EWMA of the expected transmission time (ETT) of each packet. If a sender does not get a chance to transmit as frequently due to asymmetry in the operational phase, the ETT in the operational phase 206 increases compared to the reference phase 204. If the ETT increases by more than a threshold amount, a power increase is triggered.

Embodiments of the present invention increase and decrease power at a granularity of 3 dB between a minimum and a maximum. In one embodiment of the invention, 3 db of granularity is considered optimal because finer power control may not be useful in indoor environments, and conversely, coarser granularity of power control would reduce the overall benefits of power control.

The process of increasing and decreasing transmission power is similar to rate adaptation in RRAA+. The present invention maintains for each power level, the probability that it transitions to this level from the next higher level. Every time at least one of the conditions on the performance metrics are satisfied, the probability of returning to this power level is reduced before transitioning to the next higher rate.

Embodiments of the present invention require the AP to direct each of its clients to use a chosen power level for the return link. There is a general assumption that the forward and reverse links are tuned to the same power, although, this is not a necessity for the invention to function. Those skilled in the art will appreciate that there are more sophisticated methods that can be used to tune forward and reverse links differently. For instance, to set the client power level from the AP, the 802.11h standard already specifies the necessary protocol message formats.

Figure 5:
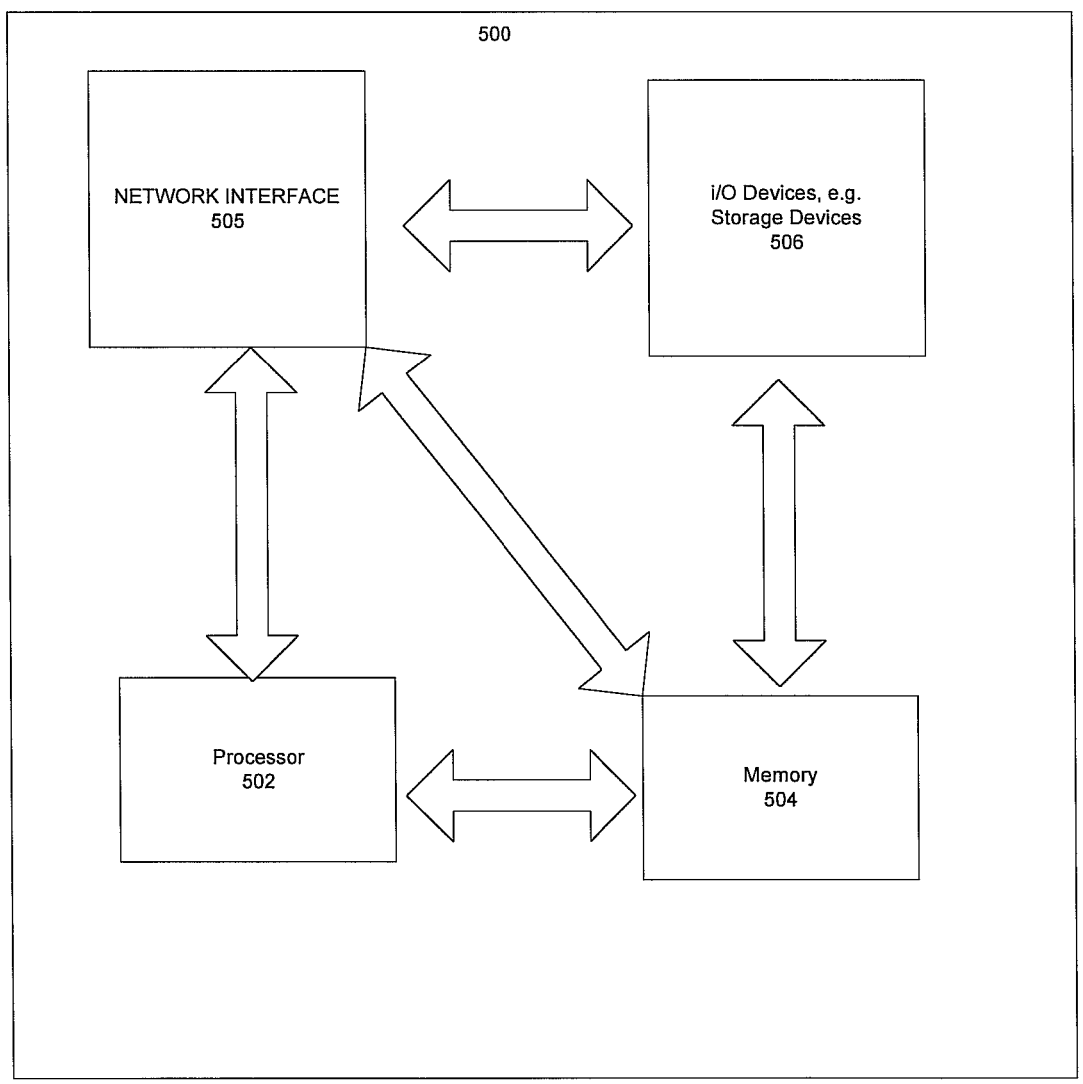
FIG. 5 shows a block diagram of a general purpose computer in accordance with one embodiment of the present invention.

FIG. 5 depicts a high level block diagram of a general purpose computer suitable for use in performing the functions described herein, including the steps shown in the flowcharts of FIGS. 3 and 4. As depicted in FIG. 5, the system 500 includes a processor element 502 (e.g., a CPU) for controlling the overall function of the system 500. Processor 502 operates in accordance with stored computer program code, which is stored in memory 504. Memory 504 represents any type of computer readable medium and may include, for example, RAM, ROM, optical disk, magnetic disk, or a combination of these media. The processor 502 executes the computer program code in memory 504 in order to control the functioning of the system 500. Processor 502 is also connected to network interface 505, which receives and transmits network data packets. Also included are various input/output devices 506 (e.g., storage devices, including but not limited to, a tape drive, a floppy drive, a hard disk drive or compact disk drive, a receiver, a transmitter, a speaker, a display, a speech synthesizer, an output port, and a user input device (such as a keyboard, a keypad, a mouse and the like)).

Given the present description of the invention, one skilled in the art could readily implement the invention using programmed digital computers. Of course, the actual implementation of a network node in accordance with the invention would also include other components as well. However, for clarity, such other components are not shown in FIG. 5.

It should be noted that the present invention can be implemented in software and/or in a combination of software and hardware, e.g., using application specific integrated circuits (ASIC), a general purpose computer or any other hardware equivalents.

One skilled in the art will recognize that the various embodiments described herein may take different forms. For example, the embodiments described here may be implemented in both hardware and/or software. One skilled in the art will recognize in light of the forgoing that a particular implementation or deployment may be chosen. Finally while the above description describes the illustrative embodiment, one skilled in the art will also understand that the foregoing may be implemented at any point in the system between a user and a network.

The forgoing detailed description is to be understood as being in every respect illustrative and exemplary, but not restrictive, and the scope of the invention disclosed herein is not to be determined from the detailed description but rather from the claims as interpreted according to the full breadth permitted by the patent laws. It is to be understood that the embodiment shown and described herein are only illustrative of the principals of the present invention. Those skilled in the art could implant various other feature combinations without departing from the scope and sprit of the invention.

What is claimed is:

1. A method for operation of a node operating in a wireless network comprising the steps of:
    in a synchronized manner with all other nodes in said wireless network, periodically alternating between a reference phase and an operational phase;
    during the reference phase, once communication with the wireless network is established by the initial phase, transmitting at maximum power while performing a rate adaptation and variable estimation to infer said wireless network's interference characteristics at both sender and receiver; interference at the sender being estimated using an average transmission time ETT and interference at the receiver being estimated using a utility of medium reservation RTSUtil, with a determination of ETT being related to $ETT*phi2+TT*(1-phi2)$, with TT being a current transmission time and phi2 being a configurable constant; RTSUtil being set to 1 if $pRTS<(pTotal+\alpha)$ otherwise RTSUtil being set to 0, with pRTS being packet loss rate with medium reservation, pTotal being total packet loss rate, with or without medium reservation, and $\alpha$ being a configurable constant; and
    during the operational phase, transmitting at a power level that is optimal for transmission based on information obtained from the reference phase.

2. The method of claim 1, further comprising the step of, during the reference phase:
    estimating an optimal data transmission rate achievable at maximum transmit power and maintaining an average transmission rate used in the reference phase based on RateR being related to $RateR*phi1+R*(1-phi1)$, with RateR being an average rate used in the reference phase, R being a current instantaneous rate being used in the reference phase and phi1 being a configurable constant;
    estimating potential receiver side interference using utility of medium reservation in the reference phase RTSUtilR; RTSUtilR being 1 if $pRTSRef<(pTotalRef+\alpha)$ in the last X out of Y rate adaptation intervals otherwise RTSUtilR being 0, with pRTSRef being a packet loss rate with medium reservation in the reference phase, pTotalRef being a total packet loss rate, with or without medium reservation, in the reference phase and $\alpha$ being a configurable constant;
    estimating potential sender-side interference using expected transmission time of a packet from the transmitter to the receiver based on ETTR being related to $ETTR*phi2+TT*(1-phi2)$ with ETTR being an average transmission time in the reference phase, TT being a current transmission time in the reference phase and phi2 being a configurable constant; and
    communicating information responsive to said RateR, RTSUtilR, and ETTR to the operational phase.

3. The method of claim 1, further comprises the steps of, during the operational phase:
 performing rate adaptation and maintaining the average transmission rate used in the operational phase based on RateO being related to RateO*β+R*(1−β), with RateO being an average rate used in the operational phase, R being a current instantaneous rate used in the operational phase and β being a configurable constant; and
 estimating variables for detecting the problems of undesirable rate adaptation by comparing RateR and RateO, receiver side interference by comparing RTSUtilR and RTSUtilO, and channel access asymmetry by comparing ETTR and ETTO introduced by power control; and
 operating at a transmission power level optimal for avoiding problems of undesirable rate adaptation, receiver side interference and channel access asymmetry based on reference information generated during the reference phase.

4. The method of claim 3, wherein the step of estimating variables, further comprises the steps of:
 estimating an optimal data transmission rate achievable at optimal transmit power during operation,
 estimating potential receiver side interference using utility of medium reservation in the operational phase (RTSUtilO); RTSUtilO being 1 if pRTSOpr<(pTotalOpr+γ) in the last X out of Y rate adaptation intervals otherwise RTSUtilO being 0, with pRTSOpr being a packet loss rate with medium reservation in the operational phase, pTotalOpr being a total packet loss rate, with or without medium reservation, in the operational phase, and γ being a configurable constant; and
 estimating potential sender-side interference using expected transmission time of a packet from the transmitter to the receiver based on ETTO being related to ETTO*ε+TT*(1−ε) with ETTO being an average transmission time in the operational phase, TT being a current transmission time in the operational phase, and ε being a configurable constant.

5. A non-transitory computer readable medium having stored thereon a plurality of program instructions, the plurality of program instructions including instructions which, when executed by a processor, cause the processor to perform the steps of a method for operation of a node operating in a wireless network comprising:
 in a synchronized manner with all other nodes in said wireless network, periodically alternating between a reference phase and an operational phase;
 during the reference phase, once communication with the wireless network is established by the initial phase, transmitting at maximum power while performing a rate adaptation and variable estimation to infer said wireless network's interference characteristics at both sender and receiver; interference at the sender being estimated using an average transmission time ETT and interference at the receiver being estimated using a utility of medium reservation RTSUtil), with a determination of ETT being related to ETT=ETT*phi2+TT*(1−phi2), with TT being a current transmission time and phi2 being a configurable constant; RTSUtil being set to 1 if pRTS<(pTotal+α) otherwise RTSUtil being set to 0, with pRTS being packet loss rate with medium reservation, pTotal being total packet loss rate, with or without medium reservation, and α being a configurable constant; and
 during the operational phase, transmitting at a power level that is optimal for transmission based on information obtained from the reference phase.

6. The non-transitory computer readable medium of claim 5, further comprising program instructions which cause the processor to perform the steps of, during the reference phase:
 estimating an optimal data transmission rate achievable at maximum transmit power and maintaining an average transmission rate used in the reference phase based on RateR being related to RateR*phi1+R*(1−phi1), with RateR being an average rate used in the reference phase, R being a current instantaneous rate being used in the reference phase and phi1 being a configurable constant;
 estimating potential receiver side interference using utility of medium reservation in the reference phase RTSUtilR; RTSUtilR being 1 if pRTSRef<(pTotalRef+α) in the last X out of Y rate adaptation intervals otherwise RTSUtilR being 0, with pRTSRef being a packet loss rate with medium reservation in the reference phase, pTotalRef being a total packet loss rate, with or without medium reservation, in the reference phase and α being a configurable constant;
 estimating potential sender-side interference using expected transmission time of a packet from the transmitter to the receiver based on ETTR being related to ETTR*phi2+TT*(1−phi2), with ETTR being an average transmission time in the reference phase, TT being a current transmission time in the reference phase and phi2 being a configurable constant; and
 communicating information responsive to said RateR, RTSUtilR, and ETTR to the operational phase.

7. The non-transitory computer readable medium of claim 5, further comprises program instructions which cause the processor to perform the steps of, during the operational phase:
 performing rate adaptation and maintaining the average transmission rate used in the operational phase based on RateO being related to RateO*β+R*(1−β), with RateO being an average rate used in the operational phase, R being a current instantaneous rate used in the operational phase and β being a configurable constant; and
 estimating variables for detecting the problems of undesirable rate adaptation by comparing RateR and RateO, receiver side interference by comparing RTSUtilR and RTSUtilO, and channel access asymmetry by comparing ETTR and ETTO introduced by power control; and
 operating at a transmission power level optimal for avoiding problems of undesirable rate adaptation, receiver side interference and channel access asymmetry based on reference information generated during the reference phase.

8. The non-transitory computer readable medium of claim 7, wherein the program instructions causing the processor to estimate variables further comprises program instructions which cause the processor to perform the steps of:
 estimating an optimal data transmission rate achievable at optimal transmit power during operation,
 estimating potential receiver side interference using utility of medium reservation in the operational phase (RTSUtilO); RTSUtilO being 1 if pRTSOpr<(pTotalOpr+γ) in the last X out of Y rate adaptation intervals otherwise RTSUtilO being 0, with pRTSOpr being a packet loss rate with medium reservation in the operational phase, pTotalOpr being a total packet loss rate, with or without medium reservation, in the operational phase, and γ being a configurable constant; and
 estimating potential sender-side interference using expected transmission time of a packet from the transmitter to the receiver based on ETTO being related to ETTO*ε+TT*(1−ε) with ETTO being an average transmission time in the operational phase, TT being a current transmission time in the operational phase, and ε being a configurable constant.

* * * * *